United States Patent
Jones et al.

(10) Patent No.: US 9,842,306 B2
(45) Date of Patent: *Dec. 12, 2017

(54) APPARATUS AND METHOD OF DETERMINING A LIKELIHOOD OF TASK COMPLETION FROM INFORMATION RELATING TO THE READING OF RFID TAGS

(71) Applicant: Wal-Mart Stores, Inc., Bentonville, AR (US)

(72) Inventors: Nicholaus A. Jones, Fayetteville, AR (US); Abu Rasel, Bentonville, AR (US); Bruce W. Wilkinson, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 23 days.

This patent is subject to a terminal disclaimer.

(21) Appl. No.: 14/977,478

(22) Filed: Dec. 21, 2015

(65) Prior Publication Data

US 2016/0110676 A1    Apr. 21, 2016

Related U.S. Application Data

(63) Continuation of application No. 14/092,461, filed on Nov. 27, 2013, now Pat. No. 9,251,488, which is a
(Continued)

(51) Int. Cl.
*H01Q 5/22* (2015.01)
*G06Q 10/06* (2012.01)
(Continued)

(52) U.S. Cl.
CPC . *G06Q 10/063114* (2013.01); *G06K 7/10366* (2013.01); *G06Q 10/06316* (2013.01); *G06Q 10/087* (2013.01); *G06Q 10/0833* (2013.01)

(58) Field of Classification Search
CPC ................... G06K 7/10297; G06Q 10/06316
See application file for complete search history.

(56) References Cited

U.S. PATENT DOCUMENTS 5,376,778 A    12/1994   Kreft
6,641,036 B1   11/2003   Kalinowski
(Continued)

FOREIGN PATENT DOCUMENTS

CN    101021894    8/2007
CN    101076644    11/2007
(Continued)

OTHER PUBLICATIONS

EPCglobal; 'EPC(TM) Radio-Frequency Identity Protocols Class-1 Generation-2 UHF RFID Protocol for Communications at 860 MHz-960 MHz Version 1.0.9;' Specification for RFID AIR Interface by EPCglobal Inc.; 94 pages, Jan. 2005.
(Continued)

*Primary Examiner* — Omeed Alizada
(74) *Attorney, Agent, or Firm* — Fitch, Even, Tabin & Flannery LLP

(57) ABSTRACT

Methods and apparatuses are provided using RFID devices to assist in determining a likelihood that the performance of a task has been completed. In one implementation, an apparatus comprises a radio frequency identification (RFID) reader and a control circuit operably coupled to the RFID reader. The control circuit is configured to: detect, using at least information received via the RFID reader regarding a reading of one or more RFID tags by the RFID reader, one or more circumstances that evidence a status of interest pertaining to performance of a task of interest; and make a determination that the performance of the task of interest has likely been completed.

37 Claims, 10 Drawing Sheets

Related U.S. Application Data continuation-in-part of application No. 13/870,647, filed on Apr. 25, 2013, now Pat. No. 9,230,145.

(51) Int. Cl.
*G06Q 10/08* (2012.01)
*G06K 7/10* (2006.01)

(56) References Cited

U.S. PATENT DOCUMENTS

| | | |
|---|---|---|
| 6,680,675 B1 | 1/2004 | Suzuki |
| 6,894,660 B2 | 5/2005 | Sanogo |
| 6,946,951 B2 | 9/2005 | Cole |
| 6,992,567 B2 | 1/2006 | Cole |
| 7,170,415 B2 | 1/2007 | Forster |
| 7,187,267 B2 | 3/2007 | Cole |
| 7,187,288 B2 | 3/2007 | Mendolia |
| 7,205,896 B2 | 4/2007 | Wu |
| 7,221,259 B2 | 5/2007 | Cole |
| 7,413,124 B2 | 8/2008 | Frank |
| 7,432,817 B2 | 10/2008 | Phipps |
| 7,528,726 B2 | 5/2009 | Lee |
| 7,633,394 B2 | 12/2009 | Forster |
| 7,642,916 B2 | 1/2010 | Phipps |
| 7,642,917 B2 | 1/2010 | Tran |
| 7,762,472 B2 | 7/2010 | Kato |
| 7,800,497 B2 | 9/2010 | Marusak |
| 7,812,729 B2 | 10/2010 | Copeland |
| 7,823,269 B2 | 11/2010 | Martin |
| 7,880,620 B2 | 2/2011 | Hatori |
| 7,973,662 B2 | 7/2011 | Phipps |
| 7,991,655 B1* | 8/2011 | Sacks ............ G06F 3/0346 235/462.45 |
| 8,063,779 B2 | 11/2011 | Coveley |
| 8,258,958 B2 | 9/2012 | Kang |
| 8,286,884 B2 | 10/2012 | Wilkinson |
| 8,286,887 B2 | 10/2012 | Wilkinson |
| 8,410,937 B2 | 4/2013 | Collins |
| 8,505,829 B2 | 8/2013 | Wilkinson |
| 8,544,758 B2 | 10/2013 | Wilkinson |
| 8,669,915 B2 | 3/2014 | Wilkinson |
| 8,857,724 B2 | 10/2014 | Wilkinson |
| 8,857,725 B2 | 10/2014 | Wilkinson |
| 9,230,145 B2 | 1/2016 | Jones |
| 9,251,488 B2 | 2/2016 | Jones |
| 2002/0044058 A1 | 4/2002 | Heinrich |
| 2003/0025636 A1 | 2/2003 | Chen |
| 2004/0046643 A1 | 3/2004 | Becker |
| 2005/0057341 A1 | 3/2005 | Roesner |
| 2006/0065709 A1 | 3/2006 | Yamashita |
| 2006/0145710 A1 | 7/2006 | Puleston |
| 2006/0158311 A1 | 7/2006 | Hall |
| 2007/0026764 A1 | 2/2007 | Green |
| 2007/0096915 A1 | 5/2007 | Forster |
| 2007/0164868 A1 | 7/2007 | Deavours |
| 2007/0224939 A1 | 9/2007 | Jung |
| 2007/0290856 A1 | 12/2007 | Martin |
| 2008/0018431 A1 | 1/2008 | Turner |
| 2008/0048834 A1 | 2/2008 | Lenevez |
| 2008/0088459 A1 | 4/2008 | Martin |
| 2008/0094181 A1 | 4/2008 | Lenevez |
| 2008/0116256 A1 | 5/2008 | Martin |
| 2008/0129512 A1 | 6/2008 | Bielas |
| 2008/0129513 A1 | 6/2008 | Bielas |
| 2008/0201388 A1* | 8/2008 | Wood ............ G06Q 10/06 |
| 2008/0297349 A1 | 12/2008 | Leone |
| 2009/0008460 A1 | 1/2009 | Kato |
| 2009/0015480 A1 | 1/2009 | Shafer |
| 2009/0027208 A1 | 1/2009 | Martin |
| 2009/0066516 A1 | 3/2009 | Lazo |
| 2009/0108993 A1 | 4/2009 | Forster |
| 2009/0206995 A1 | 8/2009 | Forster |
| 2009/0265106 A1* | 10/2009 | Bearman ............ G06Q 10/00 701/300 |
| 2010/0001079 A1 | 1/2010 | Martin |
| 2010/0045025 A1 | 2/2010 | Cote |
| 2010/0060425 A1 | 3/2010 | Rodriguez |
| 2010/0079245 A1 | 4/2010 | Perng |
| 2010/0079287 A1 | 4/2010 | Forster |
| 2010/0230500 A1 | 9/2010 | Wilkinson |
| 2010/0277320 A1 | 11/2010 | Gold |
| 2011/0012713 A1 | 1/2011 | Wilkinson |
| 2011/0063113 A1 | 3/2011 | Hook |
| 2011/0282476 A1* | 11/2011 | Hegemier ......... G06Q 30/0621 700/100 |
| 2011/0298591 A1 | 12/2011 | Mickle |
| 2012/0013440 A1 | 1/2012 | vonBose |
| 2012/0013441 A1 | 1/2012 | Ulrich |
| 2012/0086553 A1 | 4/2012 | Wilkinson |
| 2012/0155349 A1 | 6/2012 | Bajic |
| 2012/0217307 A1 | 8/2012 | Martin |
| 2012/0274449 A1 | 11/2012 | Wilkinson |
| 2013/0040570 A1 | 2/2013 | Wilkinson |
| 2013/0043308 A1 | 2/2013 | Wilkinson |
| 2013/0206846 A1 | 8/2013 | Wilkinson |
| 2013/0299583 A1 | 11/2013 | Wilkinson |
| 2014/0266632 A1 | 9/2014 | Jones |
| 2014/0279294 A1 | 9/2014 | Field-Darragh |
| 2014/0320265 A1 | 10/2014 | Jones |
| 2014/0320271 A1 | 10/2014 | Jones |

FOREIGN PATENT DOCUMENTS

| | | |
|---|---|---|
| GB | 2481156 | 12/2011 |
| JP | 2004046904 A | 2/2004 |
| JP | 2008158569 A | 7/2008 |
| JP | 2008162120 | 7/2008 |
| JP | 2009049763 | 3/2009 |
| KR | 200412323 Y1 | 3/2006 |
| KR | 20070026388 A | 3/2007 |
| WO | 2005073937 A2 | 8/2005 |
| WO | 2010104991 A2 | 9/2010 |

OTHER PUBLICATIONS

Nikitin et al.; An Overview of Near Field UHF RFID; Feb. 2007; 8 pages; IEEE.
RFIDSOUP.com; RFID Soup; Mar. 6, 2009; 12 pages; published at http://rfidsoup.pbwiki.com.
Swedberg, Claire; RFID Puts Salt Lake City Drivers in the Fast Lane; RFID Journal; Oct. 1, 2010; 5 pages; published at http://www.rfidjournal.com/article/view/7907.
Tagsense.Com, TagSene Frequently Asked Questions; Mar. 6, 2009; 3 pages; published at www.tagsense.com/ingles/faq/faq.html.
TAGSYS; AK Product Datasheet; Dec. 19, 2012; 1 pages; published at www.tagsysrfid.com/products-services/rfid-tags/ak.
TAGSYS; AK Product Datasheet; Feb. 14, 2010; 1 page; published at webarchive.org/web/20100214004043/http://www.tagsysrfid.com/products-services/rfid-tags/ak.
TAGSYS; AK5 Converted Product Specification; Oct. 2012; 2 pages; published at www.tagsysrfid.com.
TAGSYS; AKTag UHF Tag Datasheet; Nov. 23, 2012; 2 pages; published at www.tagsysrfid.com.
TAGSYS; UHF AK Tag; Sep. 2008; 2 pages; published at www.tagsysrfid.com.
Technovelgy.com; Passive RFID Tag (or Passive Tag); Mar. 5, 2009; 5 pages; published at www.technovelgy.com.
USPTO; U.S. Appl. No. 13/870,647; Notice of Allowance dated Aug. 31, 2015.
USPTO; U.S. Appl. No. 13/870,647; Office Action dated Apr. 8, 2015.
USPTO; U.S. Appl. No. 14/092,461; Notice of Allowance dated Sep. 21, 2015.
Wikipedia; RFID; Mar. 6, 2009; 2 pages; published at http://rfidsoup.pbwiki.com.

* cited by examiner

APPARATUS AND METHOD OF DETERMINING A LIKELIHOOD OF TASK COMPLETION FROM INFORMATION RELATING TO THE READING OF RFID TAGS

RELATED APPLICATION(S)

This application is a continuation of U.S. application Ser. No. 14/092,461, entitled apparatus and method OF DETERMINING A LIKELIHOOD OF TASK COMPLETION FROM INFORMATION RELATING TO THE READING OF RFID TAGS and filed Nov. 27, 2013, which is a continuation-in-part of U.S. patent application Ser. No. 13/870,647, entitled METHOD AND APPARATUS PERTAINING TO CONVEYING INFORMATION VIA AN RFID TRANSCEIVER and filed Apr. 25, 2013, which are incorporated by reference in their entirety herein.

This application is also related to co-pending and co-owned U.S. patent application Ser. No. 13/804,393, entitled METHOD AND APPARATUS PERTAINING TO RFID TAG-BASED USER ASSERTIONS and filed Mar. 14, 2013, which is incorporated by reference in its entirety herein.

TECHNICAL FIELD

This invention relates generally to radio-frequency identification (RFID) transceivers.

BACKGROUND

RFID tags are known in the art. These so-called tags often assume the form factor of a label or a literal "tag" but are also sometimes integrated with a host article and/or its packaging. RFID tags typically comprise an integrated circuit and one or more antennas. The integrated circuit typically carries out a variety of functions including modulating and demodulating radio frequency signals, data storage, and data processing. Some integrated circuits are active or self-powered (in whole or in part) while others are passive, being completely dependent upon an external power source (such as an RFID tag reader) to support their occasional functionality.

There are proposals to utilize RFID tags to individually identify individual items. The Electronic Product Code (EPC) as managed by EPCGlobal, Inc. represents one such effort in these regards. EPC-based RFID tags each have a unique serial number to thereby uniquely identify each tag and, by association, each item correlated on a one-for-one basis with such tags. (The corresponding document entitled EPC Radio-Frequency Identity Protocols Class-1 Generation-2 UHF RFID Protocol for Communications at 860 MHz-960 MHz Version 1.0.9 is hereby fully incorporated herein by this reference.)

In addition to reading part or all of the informational contents of an RFID tag, an RFID-tag reader can also serve to convey information to an RFID tag.

BRIEF DESCRIPTION OF THE DRAWINGS

Disclosed herein are embodiments of apparatuses and methods pertaining to conveying and/or interpreting information using an RFID transceiver. This description includes drawings, wherein.

Figure 1:
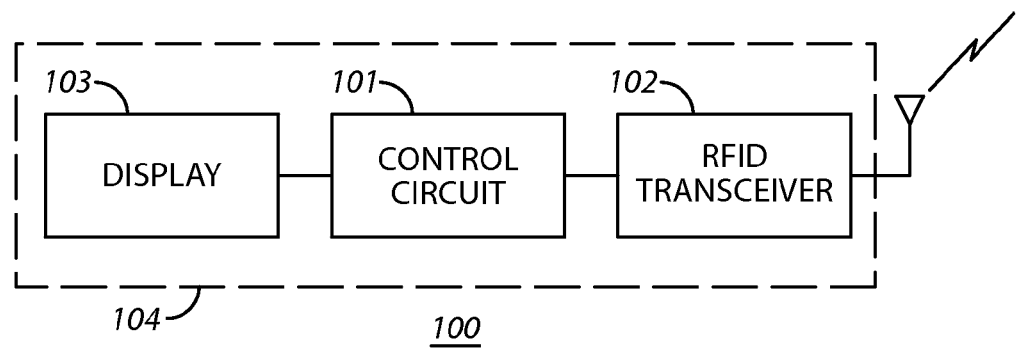
FIG. 1 comprises a block diagram as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, an RFID transceiver and RFID-tag reader cooperate to convey information from one to the other. In particular, in some embodiments, these teachings accommodate the RFID-tag reader transmitting information to the RFID transceiver that causes a modification of information presented via the RFID transceiver. By one approach an RFID-tag reader detects a circumstance that evidences a particular status as pertains to a particular item of such information in a given RFID transceiver. In such a case these teachings will accommodate using such an RFID-tag reader to modify the information at the corresponding RFID transceiver.

By one approach, and by way of a non-limiting example, the aforementioned information comprises a to-do list. In this case the aforementioned modification can comprise modifying at least one to-do item in that to-do list. By one approach the aforementioned detection of a circumstance that evidences a particular status as pertains to a particular item of information comprises, at least in part, detecting a physical location of the given RFID transceiver. By way of further example, that physical location information can be compared to physical locations that correspond to specific to-do items in the to-do list to identify correlations of interest that evidence (suggest or indicate a likelihood that), for example, attention to and/or completion of specific to-do items or tasks. In some embodiments, information relating to the reading of a particular RFID transceiver by an RFID-tag reader (e.g., where one or both of the RFID transceiver and RFID-tag reader are located at an expected location of task performance) can be used to evidence and make a determination that the task has likely been completed by a task resource useful in performing the task.

So configured, and by way of example, associates for a given enterprise can be provided with extremely inexpensive devices that compatibly interact with the enterprise's RFID-tag reader infrastructure to receive and display, for example, individualized task assignments. More particularly, the device and the RFID-tag reader infrastructure can cooperate with one another in a manner that permits dynamic and automatic management of those task assignments. For example, completed to-do items can in many cases be automatically marked as being completed or can otherwise automatically be removed from the displayed list of to-do items.

By one approach, teachings of some embodiments facilitate determinations as to assigned task completion and/or dynamic management of task assignments without a need for direct user input to the device itself. Accordingly, the cost and complexity of the device can be reduced further by avoiding a need for buttons, switches, touch-sensitive displays, voice recognition, or the like. These teachings are also highly scalable and will accommodate a wide variety of application settings, information types and volume, and end user device configurations.

These and other benefits may become clearer upon making a thorough review and study of the following detailed description. Referring now to the drawings, and in particular to FIG. 1, a first apparatus 100 configured in accordance with these teachings includes a control circuit 101 that operably couples to an RFID transceiver 102 and a display 103. Such an apparatus 100 can be sized and have a form factor appropriate to permit the apparatus 100 to be easily carried and/or worn by an average person of either gender (for example, in a pocket or in a holster, on a lanyard that is disposed around the user's neck, as a wristwatch-styled device, and so forth). If desired, such an apparatus 100 can have other components (such as a portable power supply, one or more user-input interfaces, and so forth). For the sake of clarity and a simple example, however, such additional components are not shown here.

The RFID transceiver 102 is configured to receive information from an RFID reader and to transmit at least a unique identifier (such as a unique EPC value) to the RFID reader. The present teachings will accommodate a wide range of practices in these regards. For many application settings, however, it will suffice if the RFID transceiver 102 comprises an EPC GEN2-compliant RFID-tag transceiver of which many are well known and understood in the art.

The display 103 can comprise, for example, any of a variety of flat-screen display technologies and/or flexible-screen display technologies as desired. By one approach the display 103 comprises an electronic paper display (such as, but not limited to, an electrophoretic ink display as is known in the art).

The control circuit 101 can comprise a fixed-purpose hard-wired platform or can comprise a partially or wholly programmable platform. These architectural options are well known and understood in the art and require no further description here. This control circuit 101 is configured (for example, by using corresponding programming as will be well understood by those skilled in the art) to carry out one or more of the steps, actions, and/or functions described herein. In particular, the control circuit 101 is configured to present via the display 103 at least some of the information from the RFID reader (as received via the RFID transceiver 102). The control circuit 101 is also configured to modify at least some of the presented information in response to other items of information from the RFID reader.

As will be described below in more detail, the aforementioned information from the RFID reader can comprise, at least in part, a to-do list and hence the control circuit 101 can serve, in part, to display at least a part of that to-do list on the display 103. In such a case, the aforementioned modifications can comprise modifying the to-do list as a function, at least in part, of other information from the RFID reader.

Figure 2:
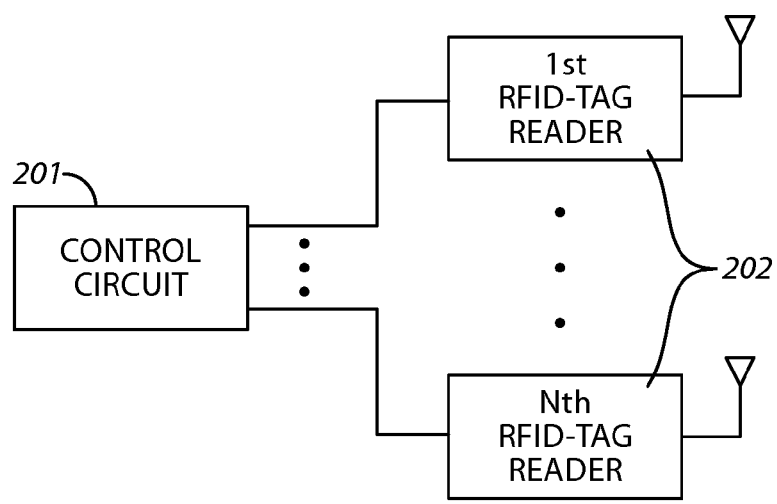
FIG. 2 comprises a block diagram as configured in accordance with various embodiments of the invention.

FIG. 2 presents a depiction of an RFID-reader system having a control circuit 201 that operably couples to a plurality of RFID-tag readers 202. There can be any number of RFID-tag readers 202 as exemplified here by a first through an Nth RFID-tag reader 202 (where "N" will be understood to comprise an integer). By one approach these RFID-tag readers 202 comprise, at least in part, overhead RFID-tag readers that hang suspended from the ceiling of the corresponding facility (not shown). Examples in such regards can be found, for example, in U.S. patent application Ser. No. 12/900,191, entitled METHOD AND APPARATUS PERTAINING TO RFID TAG READER ANTENNA ARRAY (the contents of which are fully incorporated herein by this reference). That said, the present teachings can be employed and leveraged in other application settings as well.

Figure 3:
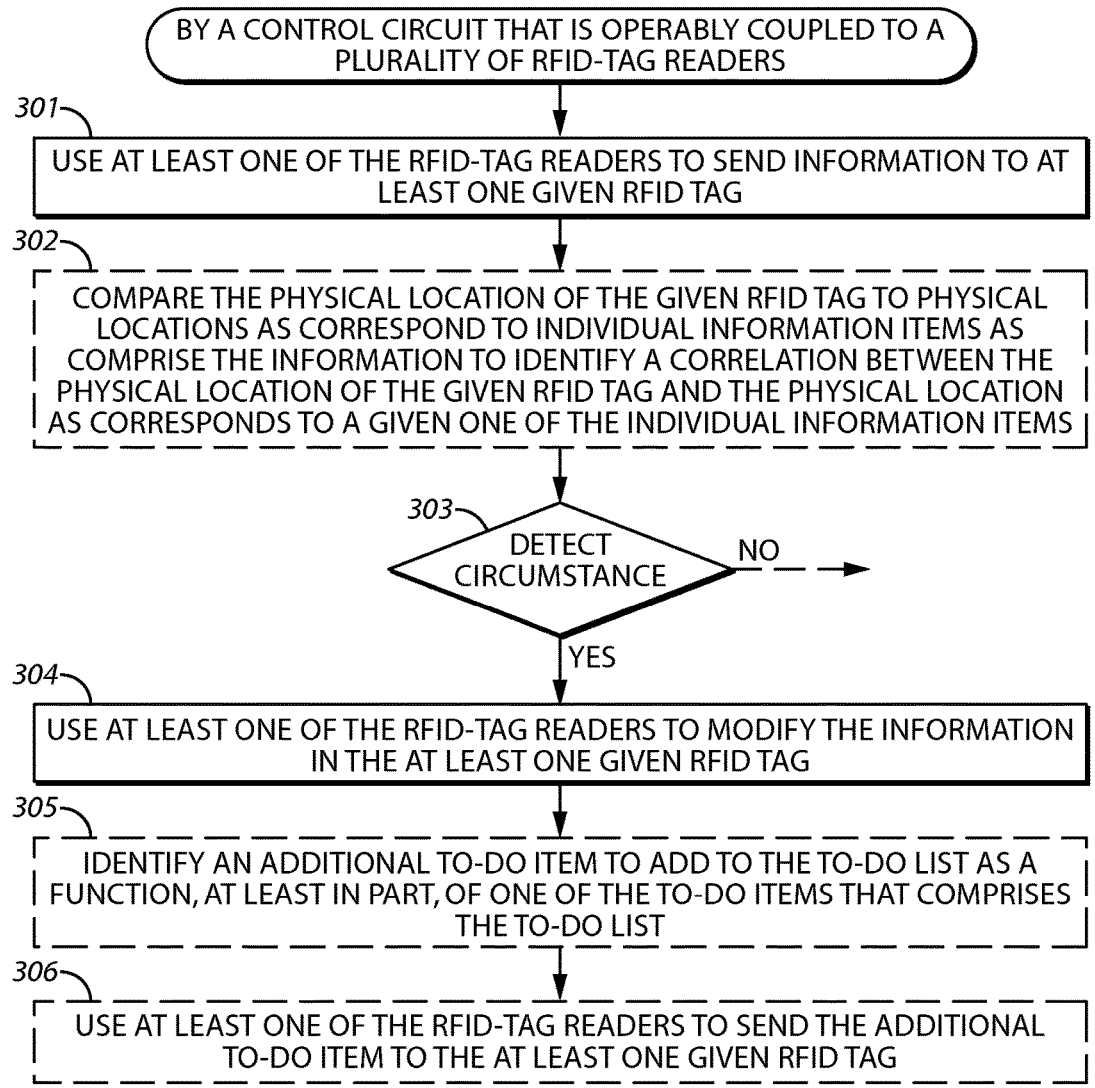
FIG. 3 comprises a flow diagram as configured in accordance with various embodiments of the invention.

This system control circuit 201 is configured to carry out various activities in support of the present teachings. By one approach, for example, this control circuit 201 is configured (via, for example, appropriate programming) to carry out the process 300 shown in FIG. 3.

At 301 the control circuit 201 uses at least one of the RFID-tag readers 202 to send information to at least one apparatus 100 as described above. For the sake of a simple, illustrative example, the remainder of this description shall presume to refer to the receiving apparatus 100 as an RFID tag. Transmitting information, such as text, from an RFID-tag reader to an RFID tag comprises a well-understood area of endeavor. Accordingly, for the sake of brevity further details in these regards are not provided here.

Figure 4:
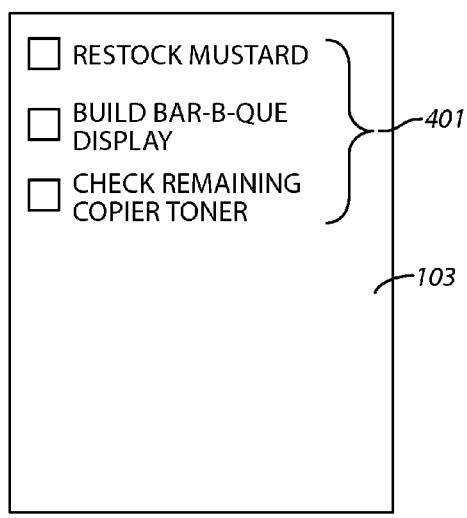
FIG. 4 comprises a screen shot as configured in accordance with various embodiments of the invention.

By one approach this information comprises, at least in part, a to-do list (i.e., a list of errands, chores, or tasks that are assigned or otherwise undertaken to be accomplished, typically within some corresponding specified or understood time frame). As noted above, the receiving apparatus 100 is configured to present such received information on its display 103. FIG. 4 presents an illustrative example of such a to-do list 401 as shown on such a display 103. In this example each to-do item comprises a brief textual task description along with an empty checkbox to denote the corresponding to-do item as being not-yet accomplished.

So configured, the to-do items can be uniquely targeted to specific receiving RFID tags (by using and leveraging, for example, the unique EPC value assigned to each such RFID tag in this example) and hence to specific individuals who are assigned, temporarily or permanently, to such tags. In this way, if desired, each associate at a given facility (such as a retail store) can be provided with a personal-to-them to-do list of tasks that are specific to their shift, location, rank, status, training, or the like.

By one optional approach, at 302 the control circuit 201 compares the physical location of the given RFID tag to physical locations as correspond to individual information items as comprise the information. This can comprise, for example, comparing the physical location of a given RFID tag to physical locations as correspond to individual to-do items on the aforementioned to-do list. There are various known ways by which the physical location of a given RFID tag can be ascertained (using, for example, radio frequency-based triangulation); accordingly, further details in those regards are not provided here.

The control circuit 201 then identifies correlations between the RFID tag's physical location and the physical locations that correspond to the given individual information items. For example, as shown in FIG. 4, the to-do item "RESTOCK MUSTARD" can have a corresponding physical location within a retail facility; i.e., a particular aisle and a particular part of that aisle where mustard is ordinarily stocked and displayed. In such a case, this step 302 can comprise identifying when the RFID tag's physical location is the same as the physical location for where mustard is ordinarily stocked and displayed.

At 303 the control circuit 201 seeks to detect one or more circumstances of interest. For example, the control circuit 201 can detect when a circumstance that evidences (e.g., suggests or indicates a likelihood that) a particular status as pertains to a particular item in the information arises (and, if desires, persists for at least some predetermined period of time). By one approach this can comprise detecting that the RFID tag is at the location where mustard is stocked and displayed, i.e., the RFID tag is at an expected location for the performance of a task. These teachings will also support the detection of a series of circumstances (e.g., occurring at one or more different locations) that together evidence the status of interest. For example, this process 300 will permit first detecting that the RFID tag is physically proximal to an area in a back store room where mustard is stored and then detecting that the RFID tag is next moved to the aisle and area where mustard if displayed and/or that the RFID tag has remained in the aforementioned area for at least a predetermined amount of time that corresponds to a restocking behavior. These events and observations, in sequence, can together constitute evidence that the status of the to-do item "RESTOCK MUSTARD" is "COMPLETED."

Figure 5:
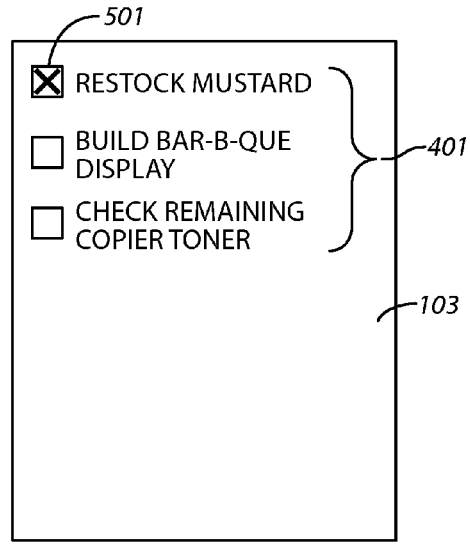
FIG. 5 comprises a screen shot as configured in accordance with various embodiments of the invention.

Upon detecting such a circumstance, at 304 the control circuit 201 then uses at least one of the plurality of RFID-tag readers 202 to modify the information in the given RFID tag. When the foregoing information comprises a to-do list as described above, this modification can comprise, by one approach, modifying at least one to-do item in the to-do list. As exemplified in FIG. 5, by one approach such a modification can comprise, if desired, modifying the corresponding to-do item(s) to indicate completion of the to-do item. As illustrated, this can comprise placing a marker 501 in the checkbox for the RESTOCK MUSTARD to-do item. As another example (not illustrated), an overstrike line could be placed over part or all of the text portion of the to-do item.

These teachings will accommodate a variety of approaches in these regards. For example, background shading could serve in these same regards. It would also be possible to change the specifics of the displayed font to indicate completion of the to-do item (by, for example, changing the color or grayscale value of the font, changing the font from a bold font to an ordinary font, by italicizing the font, and so forth).

Figure 6:
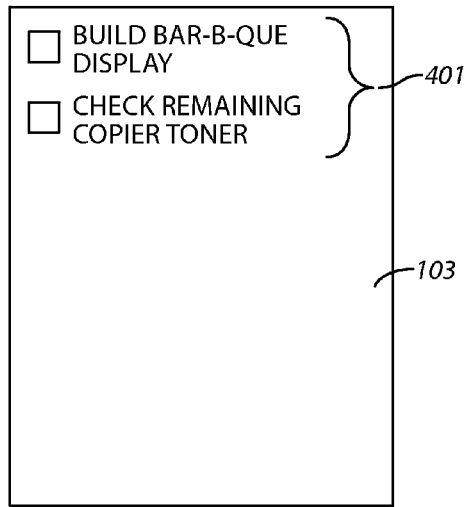
FIG. 6 comprises a screen shot as configured in accordance with various embodiments of the invention.

In lieu of the foregoing and as illustrated in FIG. 6 these teachings will also accommodate modifying the completed to-do item by simply removing the to-do item from the presented to-do list 401. By yet another approach the to-do item can first be modified as described above to indicate completion and then, after some predetermined period of time (such as ten seconds, one minute, five minutes, or some other duration of interest) the to-do item is then removed from the presented to-do list 401.

So configured, the user apparatus 100 can maintain a to-do list without requiring any specific actions from the user other than attending to the to-do items themselves. By one approach, then, the user apparatus 100 can be completely without any user-input interfaces and might simply comprise (from the standpoint of a user interface) a display that presents the aforementioned to-do list both in an original form and as automatically updated from time to time as described herein. Such a device offers a very economical approach to providing associates with a dynamic, active to-do list to help ensure that associates understand their current responsibilities and to help prompt their attention to those responsibilities.

These teachings are also highly flexible in practice and will accommodate a variety of variations, modifications, and combinations. As one example in these regards, at 305 the control circuit 201 can optionally identify an additional to-do item to add to the to-do list for a specific apparatus 100. By one example, if desired, such an additional to-do item can be identified as a function, at least in part, of one of the other to-do items that comprises the to-do list for a particular apparatus 100. As a simple illustrative example in these regards, a spill may occur in some portion of a retail facility, and a review of present to-do items indicates that a particular associate's to-do list has them working on a task in an area that is relatively near where the spill occurred.

Figure 7:
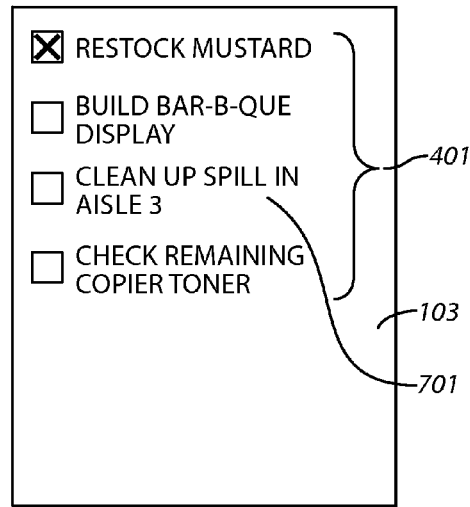
FIG. 7 comprises a screen shot as configured in accordance with various embodiments of the invention.

At 306, then, the control circuit 201 can again use one (or more) of the RFID-tag readers 202 to send the additional to-do item to one or more corresponding RFID tags to thereby supplement the already-supplied to-do lists on those apparatuses 100. As shown in FIG. 7, and by way of an illustrative example, a new to-do item CLEAN UP SPILL IN AISLE 3 (as denoted by reference numeral 701) has been received by the apparatus 100 and is now automatically presented on the display 103 as part of the to-do list 701.

In some embodiments, it is desired for a task assignment and/or task monitoring system or other human task assigner or manager to know whether or not assigned tasks have been completed. For example, in a retail store setting, a manager would like to know if employees have completed assigned tasks and/or are available for additional tasks. In some embodiments, an automated system is provided to make such determinations to avoid the need for the manager to have to walk about the store to determine if tasks are completed.

Accordingly, in a general sense, automated determinations are made as to assigned task completion without a need for user input or user monitoring and management. In such cases, it can be determined when a particular task resource associated with the performance of an assigned task is available to be assigned another task. For example, in some embodiments, information relating to the reading of a particular RFID tag by an RFID-tag reader (e.g., where one of both of the RFID transceiver and the RFID-tag reader are located at an expected location of task performance) can be used to evidence a likelihood that the task has been completed by the task resource. For example, some embodiments provide an apparatus, and corresponding method, including a radio frequency identification (RFID) reader; and a control circuit operably coupled to the RFID reader, the control circuit being configured to: detect, using at least information received via the RFID reader regarding a reading of one or more RFID tags by the RFID reader, one or more circumstances that evidence a status of interest pertaining to performance of a task of interest; and make a determination that the performance of the task of interest has likely been completed.

Figure 8:
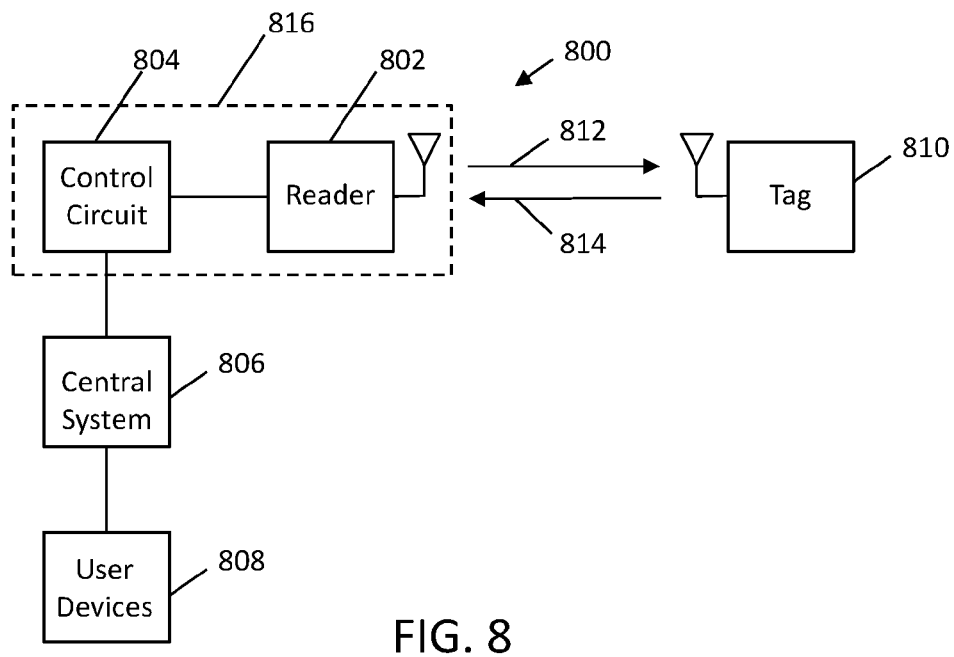
FIG. 8 is a block diagram in accordance with several embodiments.

Referring to FIG. 8, a system 800 is shown including an RFID reader 802 (which may also be referred to as an RFID-tag reader or simply as a reader) which is coupled to a control circuit 804 which is coupled to a central system 806 and which is in turn coupled to one or more user devices 808. As is well known in the art, the RFID reader 802 is configured to "read" any RFID tags (which may also be referred to as RFID transceivers), such as RFID tag 810 within the operating range of both the RFID reader 802 and the RFID tag 810. For example, as illustrated in FIG. 8, in a passive system, the RFID reader 802 includes a reader antenna and transmits a modulated radio frequency (RF) signal 812 to the RFID tag 810 (and any other RFID tag within range). The tag antenna receives the RF signal and forms an electric and magnetic field from which the RFID tag 810 draws power for the integrated circuit of the RFID tag 810. The integrated circuit then causes the RFID tag 810 to modulate a backscatter RF signal 814 back to the RFID tag reader 802, the RF signal 814 containing information encoded in the memory of the RFID tag 810, such as the ID of the RFID tag 810. The functionality and operation of the reading of tags by the RFID reader 802 and the RFID tag 810 is well known in the art.

In several embodiments, a task of interest is to be performed using or by a task resource assigned to or associated with the task of interest. For example, a task resource may be a human person (such as an employee in a retail store or manufacturing warehouse) assigned to perform the task, a machine, tool or implement (e.g., a robotic assembly, forklift, broom, duster, mop, container, etc.) that itself performs the task or is used by another person or machine, tool or implement to perform the task, and so on. In some embodiments, one of the RFID reader 802 and the RFID tag 810 are located at an expected location for the performance of the task of interest, and the other of the RFID reader 802 and RFID tag 810 is not initially at the expected location. When one or both of the RFID reader 802 and RFID tag 810 are moved relative to each other such that the RFID reader 802 reads the RFID tag 810, information relating to the reading of the RFID tag 810 is used by the control circuit 804 to detect one or more circumstances that evidence a status of interest pertaining to the performance of the task of interest and to make a determination that the performance of the task of interest has likely been completed. In some embodiments, the information is an indication that the RFID tag 810 was read at the expected location.

Figure 10:
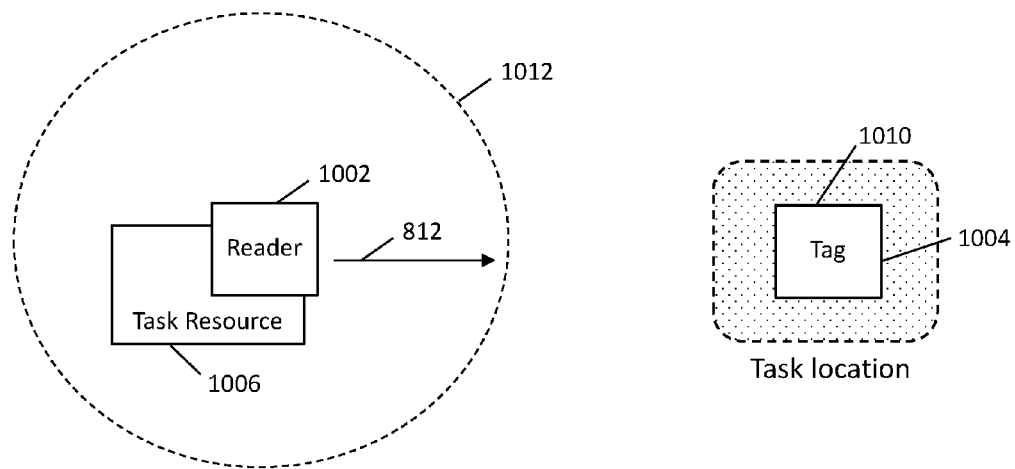
FIGS. 10-11 are diagrams illustrating an application in accordance with several embodiments.
Figure 11:
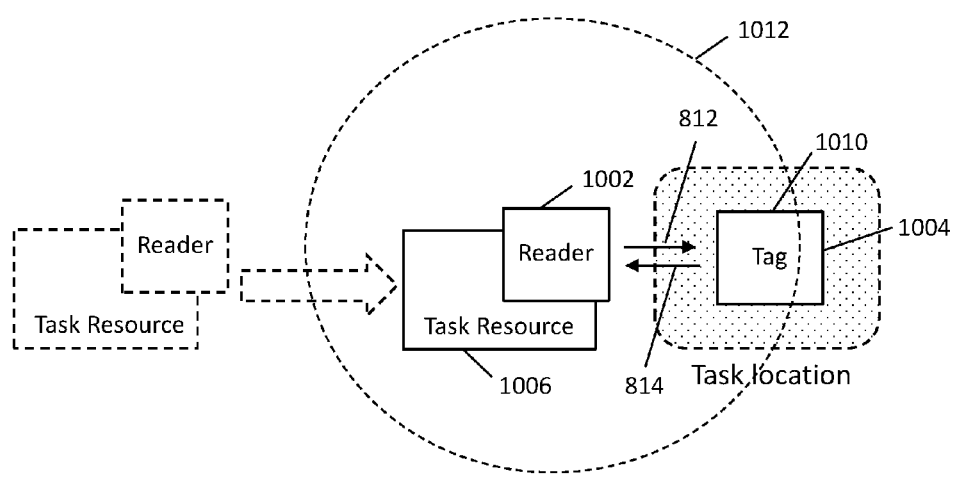
Figure 12:
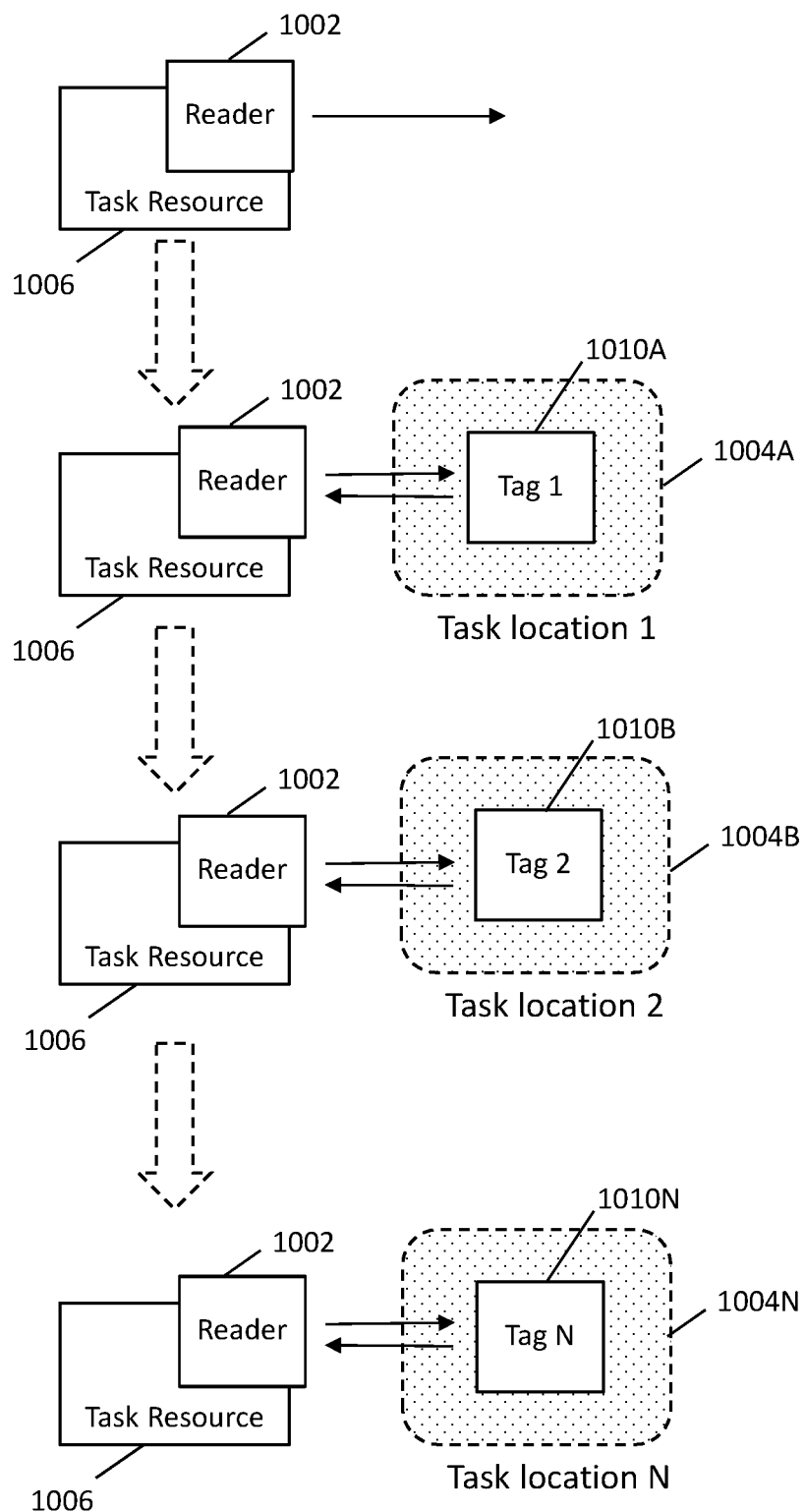
FIG. 12 is a diagram illustrating another application in accordance with several embodiments.
Figure 13:
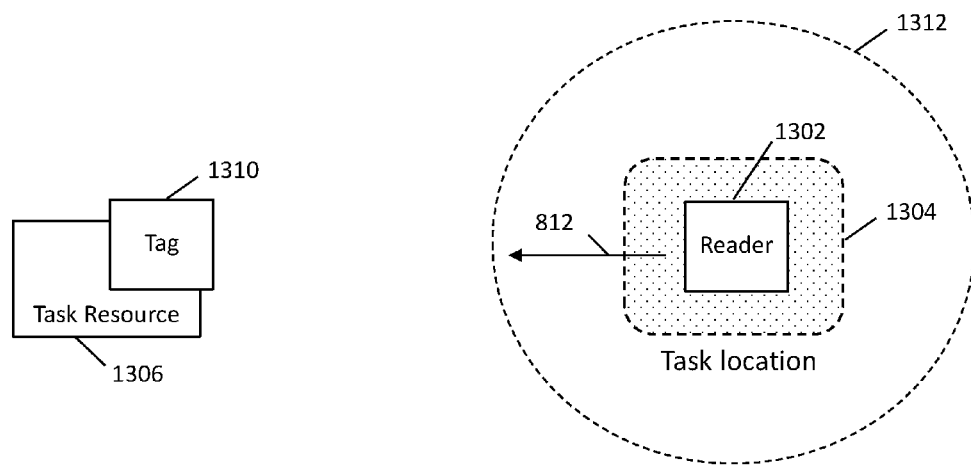
FIGS. 13-14 are diagrams illustrating another application in accordance with several embodiments.
Figure 14:
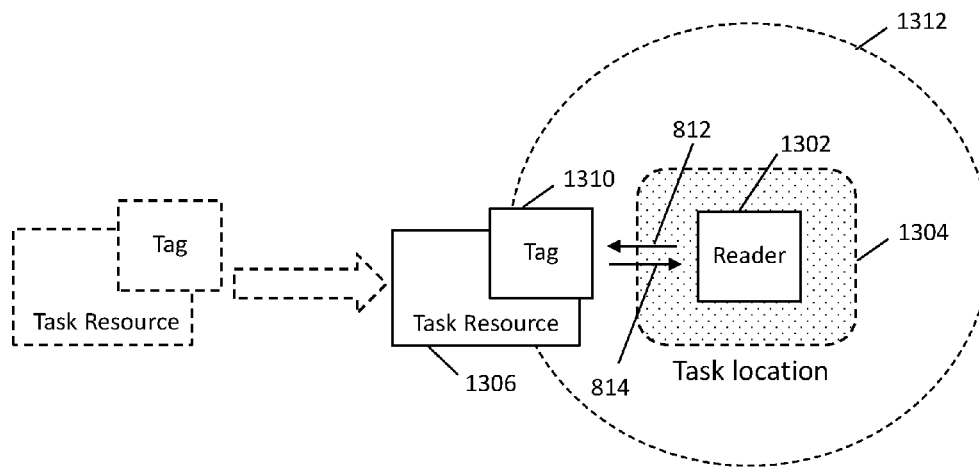
Figure 15:
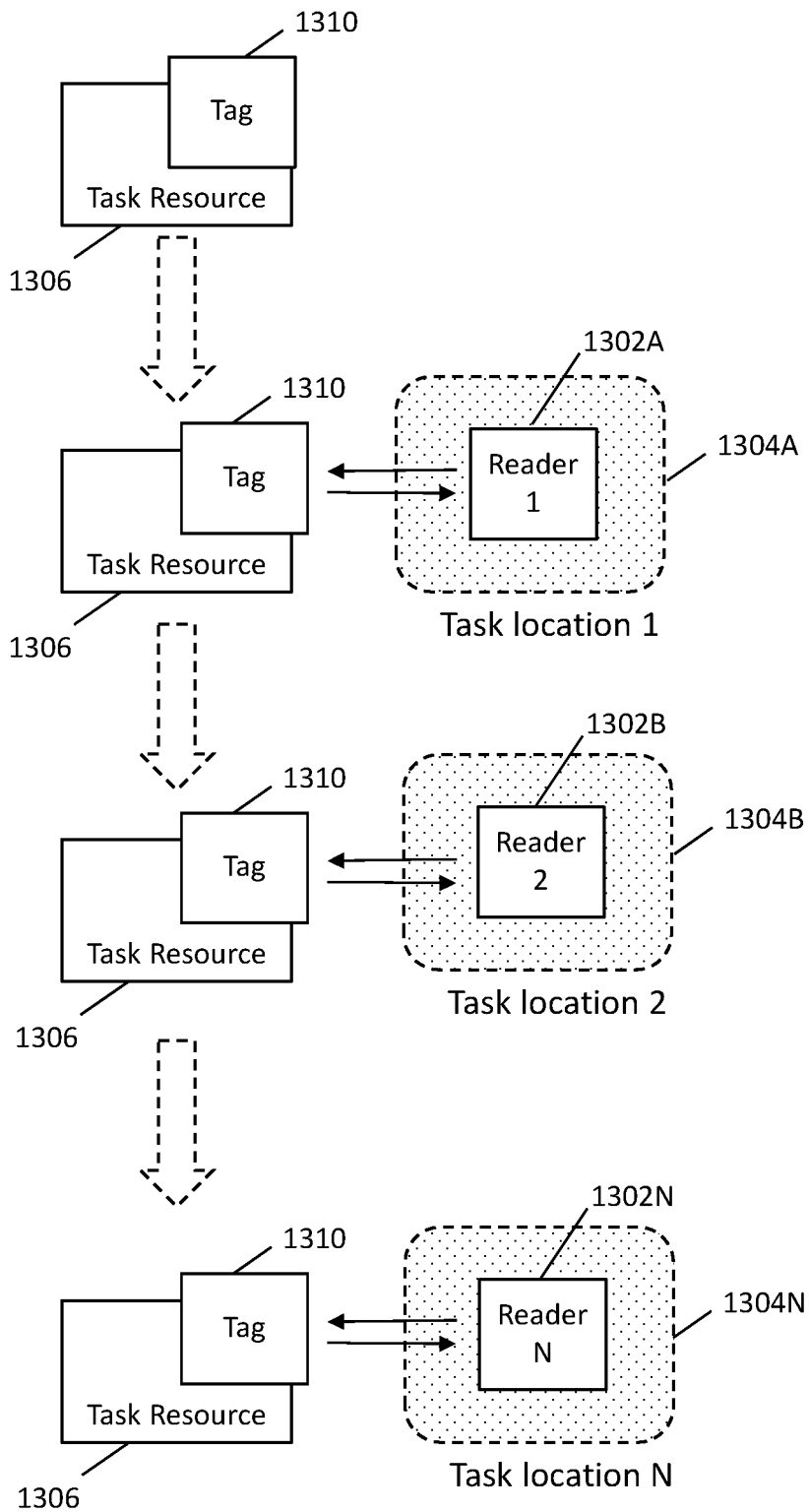
FIG. 15 a diagram illustrating another application in accordance with several embodiments.

In some embodiments, the RFID tag 810 is located at the expected location for the performance of the task, and the RFID reader 802 is associated with the task resource and is not initially at the expected location but will be moved to the expected location. FIGS. 10-12 illustrate several such embodiments. In other embodiments, the RFID reader 802 is located at the expected location for the performance of the task, and the RFID tag 810 is associated with the task resource and is not initially at the expected location but will be moved to the expected location. FIGS. 13-15 illustrate several such embodiments.

In some cases, the fact that the RFID tag 810 has been read by the RFID reader 802 is used to evidence that the performance of the task has likely been completed. For example, in a retail setting, an employee (e.g., a task resource) is assigned to clean up a spill (e.g., task of interest to be performed) in a particular section (e.g., an expected location of task performance) of the retail store. The employee carries or wears a device including the RFID reader 802 and the particular section of the store contains a particular RFID tag 810. For example, many different known RFID tags would have already been distributed throughout the store and the system assigning the task knows beforehand which RFID tag was associated with or located at the particular section of the store. When the RFID reader 802 and the RFID tag 810 are within range of each other, the RFID tag 810 is read by the RFID reader 802. This information relating to the reading of the RFID tag is transmitted or coupled to the control circuit 804, which uses this information to detect the circumstance of interest (e.g., the reading of a particular tag at the known expected location for the performance of the task) and accordingly, determines that the task of interest has likely been completed. This determination is made, in some embodiments, by the simple fact that the task resource is brought into proximity of the expected location. In other embodiments, this determination may be made after the expiration of a known amount of time after the time that the RFID tag 810 is first read, e.g., in order to allow time to complete the task of interest.

In some embodiments, the control circuit 804 is integrated with or part of the device or apparatus including the RFID reader 802 (as indicated by the dashed box 816). In such cases, it is noted that when the RFID reader 802 and control circuit 804 are integrated, a function indicated herein as being performed by the control circuit may also be performed by the RFID reader 802. In other embodiments, the control circuit 804 is separate from and coupled to the RFID reader 802. For example, the control circuit 804 may be located at, integrated into or coupled to the central system 806. In such cases, the control circuit 804 is coupled by one or more wired and/or wireless communication links using the appropriate communicating devices. Further, in some embodiments, the central system 806 may be used to manage the assignment of tasks to be performed using the detections and determinations made by the control circuit 804. For example, the central system 806 may maintain a to-do list of tasks assigned to a particular task resource, and mark a given task as having been completed. Additionally, the central system 806 may determine that the task resource is now available for one of more additional tasks to be assigned or associated to the task resource.

Figure 9:
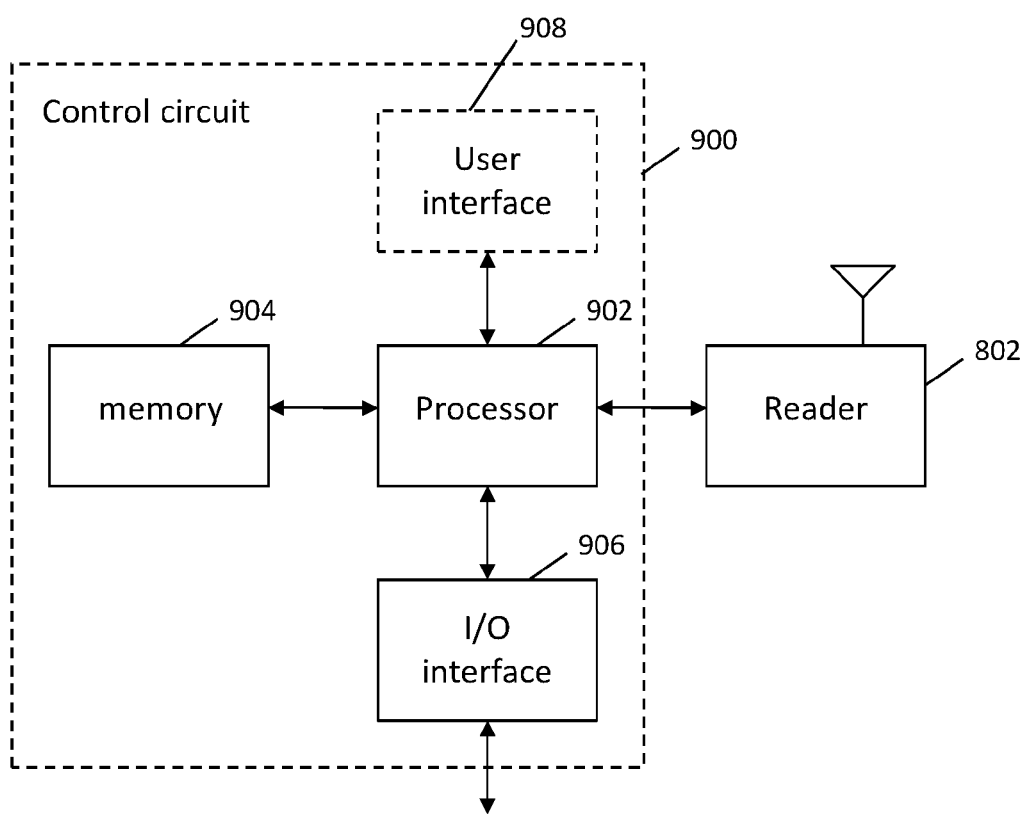
FIG. 9 is a block diagram in accordance with several embodiments.

FIG. 9 illustrates one embodiment of a control circuit such as generally shown in FIG. 8. The control circuit 900 includes a processor 902, a memory 904, an input/output (I/O) interface 906 and an optional user interface 908. Generally, the memory 904 stores the operational code or set of instructions that is executed by the processor 902 to implement the functionality of the circuit. The memory 904 additional stores any particular data that may be needed to detect the circumstances of interest and make the determinations discussed herein. Such data may be pre-stored in the memory or be received, for example, from the central system 802 during use. It is understood that the processor 902 may be implemented as one or more processor devices as are well known in the art. Similarly, the memory 904 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 514 is shown as internal to the system 500; however, the memory 514 can be internal, external or a combination of internal and external memory. Additionally, the control circuit may include a power supply (not shown) or it may receive power from an external source.

The processor 902 and the memory 904 may be integrated together, such as in a microcontroller, application specification integrated circuit, field programmable gate array or other such device, or may be separate devices coupled together. The I/O interface 906 allows communicational coupling of the control circuit to external components, such as the central system 806. Accordingly, the I/O interface 906 may include any known wired and/or wireless interfacing device, circuit and/or connecting device. In some embodiments, a user interface 908 is included in the control circuit 900 which may be used for user input and/or output display. For example, the user interface 908 may include any known input devices, such a buttons, knobs, selectors, switches, keys, touch input surfaces and/or displays, etc. Additionally, the user interface 908 may include one or more output display devices, such as lights, visual indicators, display screens, etc. to convey information to a user, such as a given to-do list, or a given task to be performed, or an indication that the device has determined that a given task has likely been completed. The control circuit 900 is configured to communicate with the reader 802 to control its operation and to receive information from the RFID reader 802 regarding the reading of certain RFID tags. While FIG. 9 illustrates the RFID reader 802 being coupled to the processor 902, it is understood that the reader 802 may actually be coupled to a communication bus of the control circuit 900 to which the processor 902 and/or memory 904 may also be coupled.

Generally, the control circuits 804 and 900 can comprise a fixed-purpose hard-wired platform or can comprise a partially or wholly programmable platform. These architectural options are well known and understood in the art and require no further description here. This control circuit 804 and 900 are configured (for example, by using corresponding programming as will be well understood by those skilled in the art) to carry out one or more of the steps, actions, and/or functions described herein.

To further illustrate embodiments that detect circumstances of interest and make determinations that the performance of a task has likely been completed, reference is now made to several example applications such as illustrated in FIGS. 10-15. For simplicity, an RFID-tag reader and an RFID tag may be referred to simply as a reader and a tag.

In FIG. 10, a given RFID tag 1010 is at an expected location 1004 for the performance of a task of interest that has been assigned or associated with a task resource 1006. An RFID reader 1002 is located with the task resource 1006 which is mobile relative to the expected location 1004. The reader 1002 pre-stores (or receives and stores) data corresponding to the specific tag 1010, such that the reader 1002 can determine when it has read the tag 1010. The dashed circle 1012 represents the range about the reader 1002 that the reader 1002 can read the tag 1010 due to the configuration and characteristics of the reader 1002 and tag 1010. In FIG. 10, the tag 1010 and the reader 1002 are outside of the operational ranges of the devices such that the reader 1002 cannot read the tag 1010 when the reader 1002 transmits interrogation signals 812. It is noted that the range of both devices should be considered when determining if a tag can be read. For example, some readers may interrogate tags in both the near field and far field of RFID communications, but the tag is only configured to receive and respond to communications in the near field.

Next, the task resource 1006 and thus, the reader 1002 are moved at or proximate to the expected location 1004 such that the reader 1002 can now read the tag 1010. That is, the tag 1010 can now respond to the interrogation signal 812 with a response or backscatter signal 814 that is received at the reader 1002. The fact that the given tag 1002 has been read by the reader 1002 is communicated to the control circuit 804. In FIGS. 10 and 11, the control circuit 804 may be located at the task resource 1006 with the reader 1002 or may be located remotely from the task resource 1006, e.g., through a wireless communication link, at the central system 804. In either case, the control circuit detects, using the information received via the RFID reader 1002 regarding a reading of the RFID tag 1010 by the RFID reader 1002, one or more circumstances that evidence a status of interest pertaining to performance of a task of interest; and makes a determination that the performance of the task of interest has likely been completed. For example, the control circuit uses the fact that the RFID tag 1010 was read at the expected location 1004 to make a determination that the task has likely been performed. This is based on the assumption that the task was likely performed since the reading of the tag 1010 indicates that the task resource 1006 was brought into proximity with the expected location 1004. In some embodiments, the determination is further based on the elapsing of a known amount of time after the task resource is brought into this proximity. Several embodiments make use of the RFID reader 1002 and the RFID tag 1010 to detect this proximity to make the determination.

FIG. 12 illustrates another embodiment where the task of interest that has been assigned or associated with a given task resource 1006 involves the performance of multiple tasks at each of multiple expected locations. In this application, a known RFID tag having known identifying information is located at each expected location. For example, tag 1 (tag 1010A) is located at expected location 1 (location 1004A), tag 2 (tag 1010B) is located at expected location 2 (location 1004B), and so on up to tag N (tag 1010N) which is located at expected location N (location 1004N). In this example, the given task of interest involves the performance of sub-tasks at each of task locations 1-N. The reader 1002 pre-stores (or receives and stores) the IDs of the tags it should be trying to read. When the task resource 1006 is moved to or into proximity to expected location 1 (1004A), the reader 1002 then reads tag 1010A and this information relating to the reading of this tag is coupled to the control circuit, which can use this information to detect the circumstance (proximity of task resource 1006 to location 1004A) and make a determination that the performance of the task (or sub-task) at that location has likely been completed. Next, the task resource 1006 is moved to or into proximity to expected location 2 (location 1004B), and the reader 1002 reads tag 1010B which information is coupled to the control circuit, which can use this information to detect the circumstance (proximity of task resource 1006 to location 1004B) and make a determination that the performance of the task (or sub-task) at that location has likely been completed. This process continues until the task resource 1006 is moved to or into proximity to expected location N (location 1004N), and the reader 1002 reads tag 1010N which information is coupled to the control circuit, which can use this information to detect the circumstance (proximity of task resource 1006 to location 1004N) and make a determination that the performance of the task (or sub-task) at that location has likely been completed. Again, the determination may be made upon the fact that the given tag has been read at the given location. In some embodiments, the determination is made after the elapsing of a predetermined amount of time after the tag has been read at the expected location. Once the control circuit has made a determination that all sub-tasks have been likely performed, it makes a determination that the task of interest has likely been performed.

In the example applications of FIGS. 13-15, the reader is located at the expected location and the tag is located with the task resource.

For example, in FIG. 13, an RFID reader 1302 is at an expected location 1304 for the performance of a task of interest that has been assigned or associated with a task resource 1006. An RFID tag 1310 is located with a task resource 1306 which is mobile relative to the expected location 1304. The reader 1302 pre-stores (or receives and stores) data corresponding to the specific tag 1310, such that the reader 1302 can determine when it has read the tag 1310. The dashed circle 1312 represents the range about the reader 1302 that the reader 1302 can read the tag 1310 due to the configuration and characteristics of the reader 1302 and tag 1310. In FIG. 13, the tag 1310 and the reader 1302 are outside of the operational ranges of the devices such that the reader 1302 cannot read the tag 1310 when the reader 1302 transmits interrogation signals 812. It is noted that the range of both devices should be considered when determining if a tag can be read. For example, some readers may interrogate tags in both the near field and far field of RFID communications, but the tag is only configured to receive and respond to communications in the near field.

Next, the task resource 1306 and thus, the tag 1302 are moved at or proximate to the expected location 1304 such that the reader 1302 can now read the tag 1310. That is, the tag 1310 can now receive and respond to the interrogation signal 812 with a response or backscatter signal 814 that is received at the reader 1302. The fact that the given tag 1302 has been read by the reader 1302 is communicated to the control circuit 804. In FIGS. 13 and 14, the control circuit 804 may be located at the expected location 1304 with the reader 1302 or may be located remotely from the expected location, e.g., through a wired or wireless communication link, at the central system 804. In either case, the control circuit detects, using the information received via the RFID reader 1302 regarding a reading of the RFID tag 1310 by the RFID reader 1302, one or more circumstances that evidence a status of interest pertaining to performance of a task of interest; and makes a determination that the performance of the task of interest has likely been completed. For example, the control circuit uses the fact that the RFID tag 1310 was read by the reader 1302 at the expected location 1304 to make a determination that the task has likely been performed. This is based on the assumption that the task was likely performed since the reading of the tag 1310 indicates that the task resource 1306 was brought into proximity with the expected location 1304. In some embodiments, the determination is further based on the elapsing of a known amount of time after the task resource is brought into this proximity. Several embodiments make use of the RFID reader 1302 and the RFID tag 1310 to detect this proximity to make the determination.

FIG. 15 illustrates other embodiments where the task of interest that has been assigned or associated with a given task resource 1306 involves the performance of multiple tasks at each of multiple expected locations. In this application, a known RFID reader is located at each expected location. For example, reader 1 (reader 1302A) is located at expected location 1 (location 1304A), reader 2 (reader 1302B) is located at expected location 2 (location 1304B), and so on up to reader N (reader 1302N) which is located at expected location N (location 1304N). In this example, the given task of interest involves the performance of sub-tasks at each of task locations 1-N. The readers 1302A, 1302B, 1302N pre-store (or receive and store) the IDs of the tag 1310 they should be trying to read. When the task resource 1306 is moved to or into proximity of expected location 1 (1304A), the reader 1302A then reads the tag 1310 and this information relating to the reading of the tag 1310 is coupled to the control circuit, which can use this information to detect the circumstance (proximity of task resource 1306 to location 1304A) and make a determination that the performance of at least a portion of the task (sub-task) at that location has likely been completed. Next, the task resource 1306 is moved to or into proximity to expected location 2 (location 1304B), and the reader 1302B reads the tag 1310 which information is coupled to the control circuit, which can use this information to detect the circumstance (proximity of task resource 1306 to location 1304B) and make a determination that the performance of the task (or sub-task) at that location has likely been completed. This process continues until the task resource 1306 is moved to or into proximity to expected location N (location 1304N), and the reader 1302N reads the tag 1310 which information is coupled to the control circuit, which can use this information to detect the circumstance (proximity of task resource 1306 to location 1304N) and make a determination that the performance of the task (or sub-task) at that location has likely been completed. Again, the determination may be made upon the fact that the given tag has been read at the given location, or may be made a specified amount of time after the tag has been read at the expected location. Once the control circuit has made a determination that all sub-tasks have been likely performed, it makes a determination that the task of interest has likely been performed. In some embodiments, the control circuit is remote from each reader 1302A, 1302B and 1302N such that it can receive the information from each reader to detect the circumstance of interest and make the determination.

It is noted that in the discussion of FIGS. 10-15 above, the various readers pre-store (or receive and store), the IDs of the tag/s 1310 they should be trying to read. In this way, the readers can determine if they have read a particular tag and communicate this information to the control circuit. However, in other embodiments, the reader does not store this ID information and the reader simply passes all IDs from all read tags to the control circuit. In this case, the control circuit pre-stores (or receives (from the central system) and stores), the IDs of the tag/s 1310 of interest. In this way, the control circuit gets information about the read tags and can determine if the particular tag/s have been read by the reader, e.g., by matching the received tag IDs to the stored tag IDs.

It is also noted that while the embodiments of FIGS. 12 and 15 are in the context of a task that is itself composed of multiple tasks or subtasks, these applications apply as well to a series of tasks (e.g., from a to-do list) that are not necessarily related to each other but are otherwise assigned to or associated with the particular task resource.

In any of the embodiments, the RFID reader 802 and the RFID tags 810 may be any known RFID type devices communicating at a variety of available ranges and frequencies. Additionally, the RFID devices may be configured as far field and/or near field devices. For example, an ultra-high frequency (UHF) RFID system includes readers that transmit signaling having a carrier frequency in the range of 860-960 MHz and can effectively read near field RFID devices up to about 1-15 cm away and can read far field RFID tags (tags with far field antenna structures) at ranges of up to 20-30 feet from the reader. Other RFID systems, such as low frequency (LF) and high frequency (HF) systems communicate using frequencies of about 125-134 KHz (LF) and about 13.56 MHz (UHF) and are suitable for shorter range communications, with each of the near and far field regions being closer to the reader.

As is known in the art, the near field is the region about the reader antenna where the reader antenna and the tag are coupled within one full wavelength of the carrier wave; however, in many practical applications, the near field is within one half wavelength of the carrier wave. The near field signal decays as the cube of the distance from the reader antenna ($1/r^3$). The far field is that region about the reader antenna where the reader antenna and the tag are coupled beyond one full wavelength of the carrier wave. The far field signal decays as the square of the distance from the reader antenna ($1/r^2$). Certain types of devices communicate only in the near field, and are often referred to as devices that communicate in the near field, such as near field communications (NFC) devices. For example, the reader may be a reader that communicates in the near field, such as an NFC RFID reader, and the tag may be a tag that communicates in the near field, such as an NFC RFID tag (or simply NFC tag). Near field communications are well understood in the art. Examples of near field communicating devices include devices complying with the Near Field Communication (NFC) Forum standards, High Frequency (HF) devices, Electronic Shelf Labels (ESLs), and so on. Other examples of devices that communicate in the near field are near field only tags such as those tags described in U.S. Pat. No. 8,286,884 and U.S. Pat. No. 8,286,887, both of which are incorporated herein by reference, i.e., tags that lack a far field antenna and magnetically, inductively or capacitively couple to a corresponding reader. Devices that communicate in the near field typically have a range of being detected at about 1-2 feet maximum depending on the frequencies used. As used herein, the term "RFID" when referring to a reader and/or tag is meant to apply generally to both far field and/or near field (e.g., NFC or other near field communicating) devices.

Another way to view near and far field communications relates to how the reader and the tag are coupled together. The reader and the near field tag communicate through magnetic, inductive or capacitive coupling between the reader antenna and the tag antenna (typically a near field loop). For example, a current is induced in the reader antenna (e.g., loop antenna), which when brought into close range with the tag antenna (loop antenna) induces a current in the tag antenna which is modulated according to the data of the tag and induced back to the reader antenna. This type of near field communication is well known in the art.

With far field RFID devices, the reader and the tag communicate through the transmission of electromagnetic energy from the reader to the tag which is reflected back as transmitted electromagnetic energy to the reader. Far field communicating devices typically use dipole antennas or other antenna structures capable of transmitting energy and received transmitted energy. This type of far field communication is well known in the art.

It is noted that in some embodiments, the read range of a given reader may be limited or changed by reducing or adjusting the power level of signals transmitted by the RFID reader. For example, the reduction of the read range results in the detection of a more precise (closer) location relationship between the reader and the tag than when the RFID reader operates at normal power. For example, far field RFID readers at normal operating power levels may be able to read far field RFID tags up to 20-30 feet. For example, the transmit power of the reader could be adjusted such that the reader can only read RFID tags at less than the normal range, e.g., up to 10-20 feet. This allows for the reading of the tag to occur only when the tag and tag reader are brought into a closer proximity compared to when the reader reads at normal power levels. Conversely, the increase of the read range results in the detection of a less precise (farther) location relationship between the reader and the tag than when the RFID reader operates at normal power. In some embodiments, the reader power levels are adjustable, e.g., increased and/or decreased, depending on the precision of location detection needed between the reader and the tag.

Whether the communication is in the near and/or far field, the illustrations of FIGS. 8-15 are intended to apply to one or the other or both. However, whether the tags are intended to be read in the near or far field can impact the read range and thus, the preferred applications of use of these techniques in determining whether assigned task are likely to be completed using the RFID devices. For example, in some embodiments in which tags can only be read in the near field (e.g., NFC devices), the resolution of the task and the expected locations can be focused relative to tags that are read in the far field. For example, in a retail store environment, an employee may be assigned to stock a particular section of the store with goods. That task may include replenishing items onto individual shelves (or bins) of a wall unit or individual bars of a hanging unit. Each of these shelves/bins may be considered an expected location for at least partial performance of the task, with each shelf/bin having a tag (or conversely, a reader). In this way, as the task resource (e.g., the employee) who is co-located (e.g., integrated within a handheld tool or a glove, etc.) with a reader (or conversely, a tag) is brought to the various expected locations (shelves/bins), the reader will be able to read the tag, and the control circuit can then detect the circumstance to make the determination that the task (or task portion) has likely been completed. For example, if the user wore a watch having an integrated reader, as the user's hand came into proximity of each shelf (the shelves having distinct tags), the reader would read the tag of each shelf and the system could detect this proximity and thus a circumstance of interest used to make a determination that each shelf was stocked.

On the other hand, if the devices are far field devices, in some embodiments, the ranges of effective tag reading may be increased, e.g., up to 20-30 feet or more so that the resolution is broadened relative to if near field communications only were used and the trackable tasks could be different. With some exemplary tasks, such devices may not be very effective to track a task resource coming into proximity with individual shelves, since the system would initially detect that the resource has come into proximity (e.g., up to 20-30 feet) of all of the shelves at once, not that the resource was within several inches of each particular shelf. In some embodiments, the use of far field devices may be better suited to applications in which the spacing between expected task locations is greater. For example, an employee is assigned to move certain pallets of goods from one area of a warehouse to another area of the warehouse using a forklift. The task resource may be considered the employee and/or the forklift. Far field tags (or conversely, far field readers) are located at each expected location and a far field reader (or conversely, a far field tag) is located at the task resource. As the task resource moves from one area of the warehouse to collect the pallets (first expected location), the tag is read and the system detects the circumstance and makes the determination that the task of collecting the pallets has likely been completed. Then, as the task resource moves to the location of the warehouse that the pallets are intended to go, the tag is read and the control circuit detects the circumstance and makes the determination that the task of moving the pallets to the new location has likely been completed. It is noted that the use of far field readers and tags may not only be useful in large area applications. That is, the use of far field readers and tags may be useful in some tasks that involve detection in smaller areas, particularly when multiple tags are used to distinguish smaller areas and/or reader transmit power levels are decreased. Accordingly, through these non-limiting examples, whether far field and/or near field devices are used may dictate which tasks will be preferred to be effectively tracked using the RFID technology, as well as the preferred relative resolution in the spacing or size of expected locations. For example, in some embodiments, if the size of the expected location is relatively small or the distance between expected locations is relatively small, then in some but not all embodiments, it may be preferred to use near field communicating RFID devices, as opposed to far field communicating RFID devices.

It is also understood that in some embodiments, the expected locations will be task and application specific. For example, in a retail store setting, example expected locations may include one or more of a merchandizing shelf, a merchandizing display, a merchandizing wall, a merchandizing rack, a merchandizing bar, a portion of a merchandizing unit, a stock container, a stock shelf, a stock drawer, a storage locker, a storage container, a truck trailer, a picking location, a riser, a display pallet, and a stock bin. This is not an exhaustive listing of all such expected locations for a retail store setting and other applications will have many other possible expected locations and tasks.

Additionally, as mentioned above, a task resource may generally be considered a resource that is assigned to or associated with the performance of at least a portion of a task. A resource may be a living or non-living thing. Living resources may include human persons (employees, and so on), animals, fish, etc. useful in performing at least in part a task. Non-living resources may be machinery, robots, tools, implements, inanimate objects that are either self-manipulated or controlled, or alternatively, manipulated or controlled by a living resource or other non-living resource. For example, a forklift or a broom may each be considered task resource under control by a human person. In other example, a robotic assembly arm under computer control that picks up a first component at a first location, moves the first component to a second location and attaches it to a second component may be considered a task resource.

In many of the embodiments, an RFID tag is located at one of the task resource and the expected location, and the RFID reader is located at the other of the task resource and the expected location. For example, in a retail store setting, a human person (e.g., a task resource) may be co-located with an RFID reader, e.g., by carrying a device (e.g., a handheld tool, device, electronic assembly or phone) with an integrated reader, wearing a garment (jacket, glove, belt, hat, helmet, etc.) with an integrated reader, riding a piece of machinery (forklift, etc.) with an integrated reader, and so on. The human person is assigned by the system to perform a task that includes one or more expected locations, each location would have an RFID tag at that location.

In some embodiments, the control circuit stores data that assists in the detection of circumstances and/or the making of determinations. For example, the control circuit stores the ID for each tag that is associated with the performance of the task and that should be read in order for the task to be considered complete. This data may be transferred to the control circuit, e.g., from the central system, or may be pre-stored in the control circuit. In some embodiments, one or more predetermined amounts of time are stored and associated with the task/s, the tag ID/s and/or the expected location/s. Such amounts of time may correspond to a particular task or task portion such that after expiration or elapsing of the amount of time after a given tag has been read, the control circuit makes the determination that the task has likely been completed. The amounts of time may be different depending on the task. For example, a greater amount of time may be stored in association with a task that would take a greater length of time to complete once the task resource has arrived at the expected location.

The control circuit may be variously located in different embodiments. In some embodiments, the control circuit is located at or integrated with the reader. For example, the reader and control circuit may be located in a mobile device that is configured to move with the task resource. In other embodiments, the control circuit is at a location remote from the reader. For example, the control circuit is integrated with or coupled to the central system. In such cases, the control circuit is communicationally coupled to the reader using one or more wired or wireless communication links.

Figure 16:
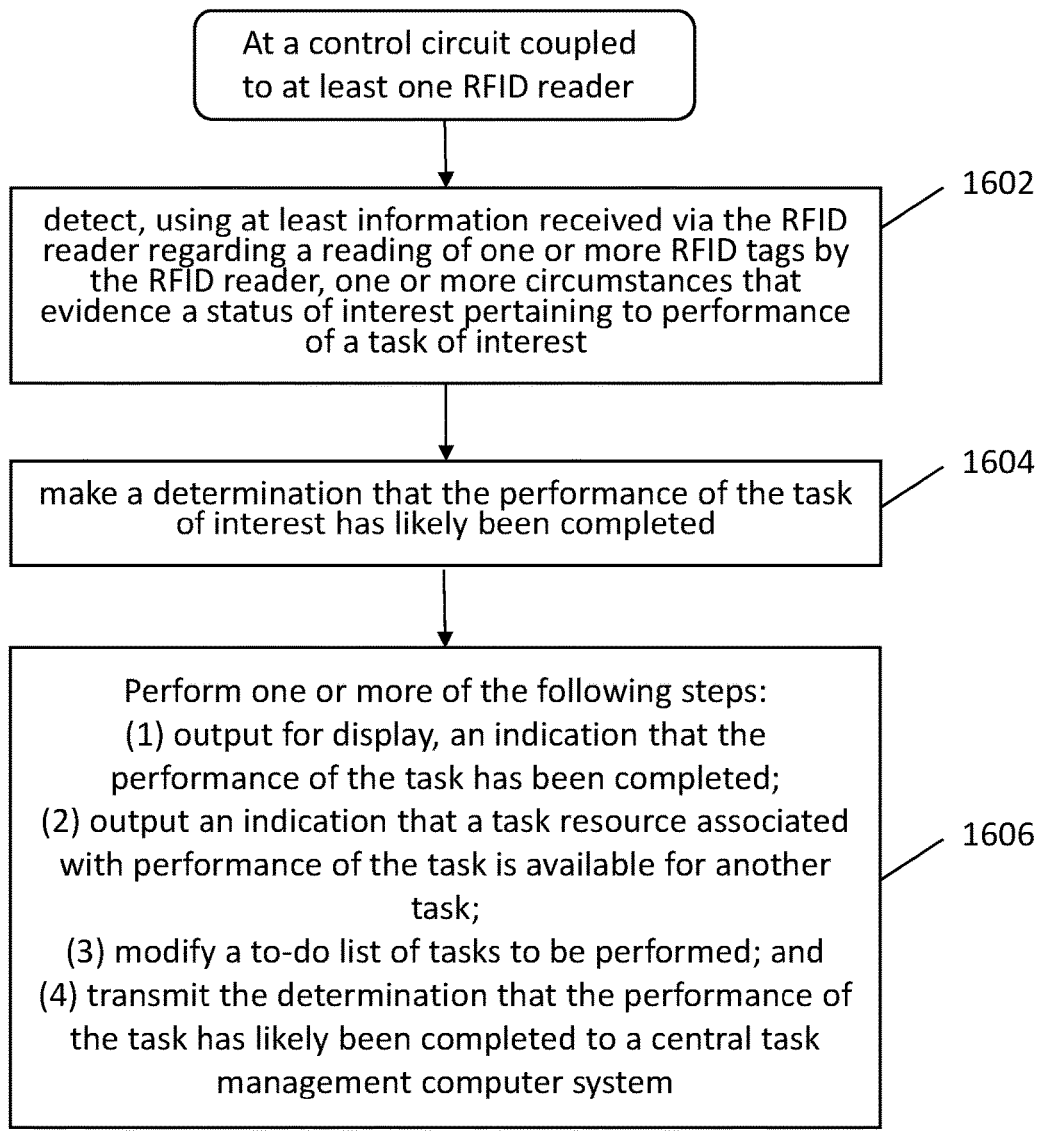
FIG. 16 is a flow diagram in accordance with several embodiments.

Reference is now made to the flow diagram of FIG. 16 which illustrates a process occurring at a control circuit coupled to at least one RFID reader in accordance with several embodiments. The process of FIG. 16 may be performed by one or more of the systems and applications described herein.

In step 1602, the control circuit uses (or is configured to use) at least information received via the RFID reader regarding a reading of one or more RFID tags by the RFID reader, to detect one or more circumstances that evidence a status of interest pertaining to performance of a task of interest. In some embodiments, the status of interest includes whether or not the performance of the task of interest has likely been completed. In some embodiments, the one or more circumstances detected relate to the detection that the one or more RFID tags have been brought into proximity with the RFID reader, for example, such that the RFID reader can read one or more of the RFID tags. For example, the information used in the detection may include an indication that at least one of the one or more RFID tags were read by the RFID reader at a first location that is an expected location for the performance of the task. Such embodiments are described in more detail with reference to FIGS. 8-15.

In some embodiments, the one or more circumstances detected relate to the detection of the location of the one or more RFID tags from information from one or more RFID readers. For example, the information used in the detection may include information from the RFID reader useful to confirm that the one or more RFID tags are located at the first location that is the expected location for the performance of the task. For example, information from multiple RFID readers may be used by the control circuit to determine a relative location of the one or more RFID tags (e.g., by triangulating the position). Such embodiments are described in more detail with reference to FIGS. 1-3.

Generally, whether an RFID tag is read by the reader to detect location or whether the RFID tag location is determined, the detected circumstance is that one of the RFID tag/s or the RFID reader/s has been detected to be at one or more expected locations associated with the performance of the task (or task portion). Generally, the expected location for the performance of the task may be any location such as described herein. Further, in some embodiments, the task of interest is assigned or associated with a task resource that is responsible for or used in the performance of the task. The task resource may be any task resource described herein. In some embodiments, one of the RFID reader and the one or more RFID tags is assigned to the task resource. For example, in some embodiments, the RFID reader is located proximate to the expected location and the one or more RFID tags are located with the task resource. Conversely, in another example, in some embodiments, the RFID reader is located with the task resource and the one or more RFID tags are located proximate to the expected location.

Then, in step 1604, the control circuit makes (or is configured to make) a determination that the performance of the task of interest has likely been completed. This may be accomplished in many ways. For example, the control circuit may make this determination simply by detecting the one or more circumstances. For example, in embodiments where information regarding the reading of the one or more RFID tags by the RFID reader is used to detect the circumstance and where this reading indicates that the RFID reader and the one or more RFID tags are at the expected location for the performance of the task, then the control circuit determines that the task has likely been performed. Generally, this follows from the assumption that if the task resource is at the location that is expected for the performance of the task, that the task has likely been performed.

In some embodiments, the determination is made after the elapsing of a predetermined amount of time after the one or more circumstances have been detected. This predetermined amount of time may be stored in the control circuit and may correspond to the task of interest. For example, the amount of time may account for the time generally needed for the task to be performed once the task resource is at the expected location for the performance of the task. It is understood that different tasks may require a different amount of time to be completed. Accordingly, in some embodiments, the control circuit makes the determination that the task has likely been performed after the elapsing of a predetermined amount of time after the one or more circumstances have been detected.

It is noted that the RFID readers and RFID tags may be any of the RFID devices described herein. For example, in some embodiments, the one or more RFID tags each comprise tags that communicate in the near field (e.g., NFC tags) and the RFID reader is configured to read the one or more near field communication tags. In another example, in some embodiments, the one or more RFID tags each comprise far field communication tags and the RFID reader is configured to read the one or more far field communication tags.

Next, once the determination has been made, the control circuit may utilize this information is many ways. For example, in step 1606, the control circuit performs (or is configured to perform) one or more optional steps described below.

In one optional step, the control circuit outputs for display, an indication that the performance of the task has been completed (step 1606(1)). Such display may be made at the user interface of the control circuit or transmitted for display to a central system or to a user device coupled to the control circuit or the central system. This may be useful for an automated task monitoring system or other human users (non-automated human task assigners or managers) to view that a given assigned task has likely been completed. This may then indicate that the task resource is available for another task.

In another optional step, the control circuit outputs an indication that a task resource associated with performance of the task is available for another task (step 1606(2)). Again, the indication may be presented to an automated task monitoring/assigning system or other human users to view that a given assigned task has likely been completed. This may then facilitate the assignment of the task resource to another task.

In another optional step, the control circuit modifies a to-do list of tasks to be performed (step 1606(3)). For example, the control circuit may remove a given to-do item on a to-do list that corresponds to the task of interest as having been completed (e.g., see FIGS. 5-6). In another example, the control circuit characterizes a given to-do item on the to-do list that corresponds to the task of interest as having been completed (e.g., see FIGS. 5 and 7).

In another optional step, the control circuit transmits the determination that the performance of the task has likely been completed to a central task management computer system (step 1606(4)). For example, this information may then be used by the computer system to indicate completion of the task and assign new tasks to the user. It may also be used so that human users may view that the task has been completed and assign new tasks to the task resource. For example, users may use user devices 808 to log into or access the information from the central system 806 to view and assign tasks to task resources.

It is noted that the process of FIG. 16 may be used to track the progress of one or more tasks of interest, whether they are each single unrelated tasks or whether they are multiple tasks (task portions or sub-tasks) of a larger task. In such cases, the task of interest involves multiple tasks occurring at multiple expected locations. In some embodiments, the information used to detect the circumstance of interest includes an indication that at least another of the one or more RFID tags were read by the RFID reader at at least another location, the at least another location being an expected other location for the performance of at least a portion of the task. For example, in some cases, the RFID reader is associated or located with the task resource which moves from location to location, with at least one RFID tag at each location. In other embodiments, the detection of the one or more circumstances that evidence the status of the task may use at least information received via the RFID reader regarding the reading of the one or more RFID tags and additional information received via another RFID reader regarding the reading of the one or more RFID tags by the other RFID reader. The additional information may include an indication that the at least one of the one or more RFID tags were read by the other RFID reader at a second location, the second location being a second expected location for the performance of at least a portion of the task of interest. For example, in some cases, the one or more RFID tags are associated or located with the task resource which moves from location to location, with at least one RFID reader at each location.

The process of FIG. 16 may be performed by any of the control circuits describe herein or other control circuits (whether embodied as controllers, computer devices, computer systems, etc.). Additionally, the control circuit may be embodied as a mobile device that moves with task resource.

For example, the control circuit may be implemented within or attached to an article of clothing, phone, or other mobile electronic device.

Figure 17:
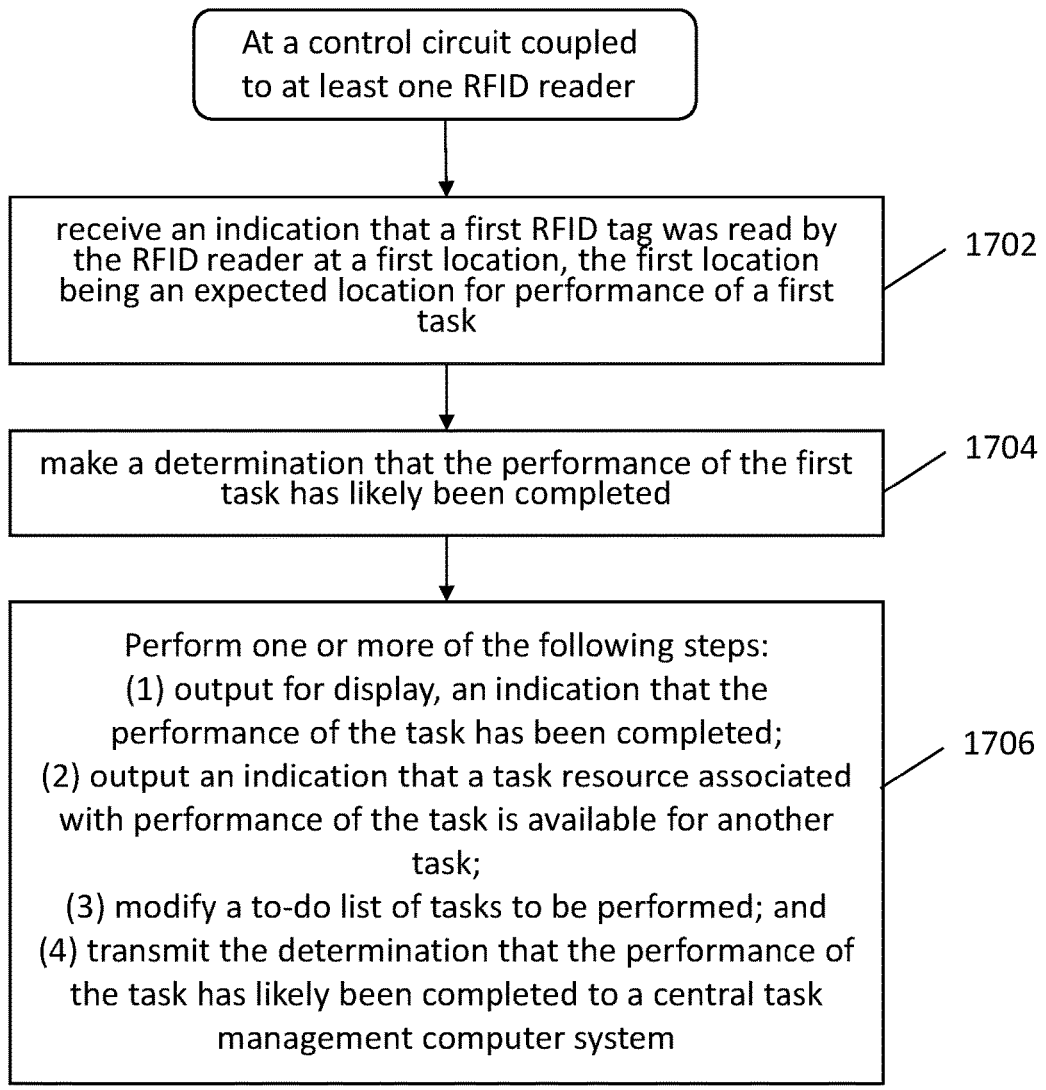
FIG. 17 is a flow diagram in accordance with several embodiments.

Reference is now made to the flow diagram of FIG. 17 which illustrates other embodiments of a process occurring at a control circuit coupled to at least one RFID reader. The process of FIG. 17 may be performed by one or more of the systems and applications described herein.

In step 1702, the control circuit receives (or is configured to receive) an indication that a first RFID tag was read by the RFID reader at a first location, the first location being an expected location for performance of a first task. In step 1704, the control circuit makes (or is configured to make) a determination that the performance of the first task has likely been completed. Next, the control circuit performs (or is configured to perform) one or more optional steps similar to those discussed in FIG. 16 (step 1706). Generally, the steps 1702, 1704 and 1706 involve any of the variations and examples as described in connection with FIG. 16 or as otherwise described herein.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept. As a specific illustrative example in these regards, the apparatus 100 can be configured to sound an audible alert upon receiving a to-do list, upon receiving a modification to an existing to-do item, and/or upon receiving a supplemental to-do item. As another illustrative example these teachings will readily accommodate having the control circuit 201 transmit information to the apparatus 100 to thereby cause the latter to present a to-do list having one or more redacted to-do items even if the corresponding associate did not themselves attend to the redacted to-do items.

What is claimed is:

1. An apparatus comprising:
a radio frequency identification (RFID) reader; and
a control circuit operably coupled to the RFID reader, the control circuit being configured to:
detect, using at least information received via the RFID reader regarding a reading of one or more RFID tags by the RFID reader, one or more circumstances that evidence a status of interest pertaining to performance of a task of interest, wherein the detection of the one or more circumstances occurs automatically when a task resource assigned to complete the task of interest arrives at an expected location for the performance of the task, and wherein the task resource is associated with the performance of the task of interest; and
make a determination that the performance of the task of interest has likely been completed.

2. The apparatus of claim 1 wherein the information comprises an indication that at least one of the one or more RFID tags were read by the RFID reader at a first location, the first location being the expected location for the performance of at least a portion of the task of interest.

3. The apparatus of claim 2 wherein the information comprises an indication that at least another of the one or more RFID tags were read by the RFID reader at at least another location, the at least another location being an expected other location for the performance of at least a portion of the task of interest.

4. The apparatus of claim 2 wherein the control circuit is operably coupled to another RFID reader, the control circuit being configured to:
detect, using at least the information received via the RFID reader regarding the reading of the one or more RFID tags by the RFID reader and using additional information received via the other RFID reader regarding another reading of the one or more RFID tags by the other RFID reader, the one or more circumstances that evidence the status of interest pertaining to the performance of the task of interest; and
make the determination that the performance of the task of interest has likely been completed,
wherein the additional information comprises an indication that the at least one of the one or more RFID tags were read by the other RFID reader at a second location, the second location being a second expected location for the performance of at least a portion of the task of interest, and wherein progress of a larger task is tracked based at least on the determination that the performance of the task of interest has likely been completed.

5. The apparatus of claim 2 wherein the expected location comprises one of the following: a merchandizing shelf, a merchandizing display, a merchandizing wall, a merchandizing rack, a merchandizing bar, a portion of a merchandizing unit, a stock container, a stock shelf, a stock drawer, a storage locker, a storage container, a truck trailer, a picking location, a riser, a display pallet, and a stock bin.

6. The apparatus of claim 1 wherein the control circuit is configured to perform at least one of the following steps:
output for display to a user, an indication that the performance of the task of interest has been completed;
output an indication that the task resource associated with performance of the task of interest is available for another task of interest;
modify a to-do list of tasks to be performed by removing a given to-do item on the to-do list that corresponds to the task of interest as having been completed;
modify a to-do list of tasks to be performed by characterizing a given to-do item on the to-do list that corresponds to the task of interest as having been completed; and
transmit the determination that the performance of the task of interest has likely been completed to a central task management computer system.

7. The apparatus of claim 1 wherein the information comprises an indication that at least one of the one or more RFID tags was read by the RFID reader.

8. The apparatus of claim 1 wherein the control circuit is configured to make the determination that the performance of the task of interest has likely been completed after an elapsing of a predetermined amount of time after the detection of the one or more circumstances.

9. The apparatus of claim 8 wherein the predetermined amount of time corresponds to the task of interest.

10. The apparatus of claim 1 wherein the control circuit is located at a computer system operably coupled to the RFID reader.

11. The apparatus of claim 1 wherein the control circuit is located in a mobile device configured to move with the task resource associated with the performance of the task of interest.

12. The apparatus of claim 1 wherein the RFID reader is located proximate to the expected location for the performance of the task of interest and the one or more RFID tags are located with the task resource associated with the performance of the task of interest.

13. The apparatus of claim 1 wherein the RFID reader is located with the task resource associated with the performance of the task of interest and the one or more RFID tags are located proximate to the expected location for the performance of the task of interest.

14. The apparatus of claim 1 wherein one of the RFID reader and the one or more RFID tags is assigned to the task resource associated with the performance of the task of interest.

15. The apparatus of claim 1 wherein the one or more RFID tags each comprise a tag that communicates in a near field, wherein the RFID reader is configured to read the one or more RFID tags in the near field.

16. The apparatus of claim 15 wherein the one or more RFID tags each comprise a tag compliant with a near field communication (NFC) standard.

17. The apparatus of claim 1 wherein the one or more RFID tags each comprise far field communication tags, wherein the RFID reader is configured to read the one or more far field communication tags.

18. A method comprising:
by a control circuit that is operably coupled to a radio frequency identification (RFID) reader:
detecting, using at least information received via the RFID reader regarding a reading of one or more RFID tags by the RFID reader, one or more circumstances that evidence a status of interest pertaining to performance of a task of interest, wherein the detecting of the one or more circumstances occurs automatically when a task resource assigned to complete the task of interest arrives at an expected location for the performance of the task, and wherein the task resource is associated with the performance of the task of interest; and
making a determination that the performance of the task of interest has likely been completed.

19. The method of claim 18 wherein the information comprises an indication that at least one of the one or more RFID tags were read by the RFID reader at a first location, the first location being the expected location for the performance of at least a portion of the task of interest.

20. The method of claim 19 wherein the information comprises an indication that at least another of the one or more RFID tags were read by the RFID reader at at least another location, the at least another location being an expected other location for the performance of at least a portion of the task of interest.

21. The method of claim 19 wherein the control circuit is operably coupled to another RFID reader,
wherein the detecting step comprises detecting, using at least the information received via the RFID reader regarding the reading of the one or more RFID tags by the RFID reader and using additional information received via the other RFID reader regarding another reading of the one or more RFID tags by the other RFID reader, the one or more circumstances that evidence the status of interest pertaining to the performance of the task of interest; and
wherein the making step comprises making the determination that the performance of the task of interest has likely been completed,
wherein the additional information comprises an indication that the at least one of the one or more RFID tags were read by the other RFID reader at a second location, the second location being a second expected location for the performance of at least a portion of the task of interest and wherein progress of a larger task is tracked based at least on the determination that the performance of the task of interest has likely been completed.

22. The method of claim 19 wherein the expected location comprises one of the following: a merchandizing shelf, a merchandizing display, a merchandizing wall, a merchandizing rack, a merchandizing bar, a portion of a merchandizing unit, a stock container, a stock shelf, a stock drawer, a storage locker, a storage container, a truck trailer, a picking location, a riser, a display pallet, and a stock bin.

23. The method of claim 18 further comprising at least one of the following steps:
outputting for display to a user, an indication that the performance of the task of interest has been completed;
outputting an indication that the task resource associated with performance the task of interest is available for another task of interest;
modifying a to-do list of tasks to be performed by removing a given to-do item on the to-do list that corresponds to the task of interest as having been completed;
modifying a to-do list of tasks to be performed by characterizing a given to-do item on the to-do list that corresponds to the task of interest as having been completed; and
transmitting the determination that the performance of the task of interest has likely been completed to a central task management computer system.

24. The method of claim 18 wherein the information comprises an indication that at least one of the one or more RFID tags was read by the RFID reader.

25. The method of claim 18 wherein the making the determination step comprises making the determination that the performance of the task of interest has likely been completed after an elapsing of a predetermined amount of time after the detection of the one or more circumstances.

26. The method of claim 25 wherein the predetermined amount of time corresponds to the task of interest.

27. The method of claim 18 wherein the control circuit is located at a computer system operably coupled to the RFID reader.

28. The method of claim 18 wherein the control circuit is located in a mobile device configured to move with the task resource associated with the performance of the task of interest.

29. The method of claim 18 wherein the RFID reader is located proximate to the expected location for the performance of the task of interest and the one or more RFID tags are located with the task resource associated with the performance of the task of interest.

30. The method of claim 18 wherein the RFID reader is located with the task resource associated with the performance of the task of interest and the one or more RFID tags are located proximate to the expected location for the performance of the task of interest.

31. The method of claim 18 wherein one of the RFID reader and the one or more RFID tags is assigned to the task resource associated with the performance of the task of interest.

32. The method of claim 18 wherein the one or more RFID tags each comprise a tag that communicates in a near field, wherein the RFID reader is configured to read the one or more RFID tags in the near field.

33. The method of claim 32 wherein the one or more RFID tags each comprise a tag compliant with a near field communication (NFC) standard.

34. The method of claim 18 wherein the one or more RFID tags each comprise far field communication tags, wherein the RFID reader is configured to read the one or more far field communication tags.

35. An apparatus comprising:
   a radio frequency identification (RFID) reader; and
   a control circuit operably coupled to the RFID reader, the control circuit being configured to:
      receive an indication that a first RFID tag was read by the RFID reader at a first location, the first location being an expected location for performance of a first task;
      automatically detect, based on the received indication, one or more circumstances that evidence a status of interest pertaining to the performance of the first task; and
      make a determination that the performance of the first task has likely been completed.

36. The apparatus of claim 1 wherein the determination of the performance of the task of interest is based on the detection of the one or more circumstances.

37. The apparatus of claim 1 wherein the determination of the performance of the task of interest is made without any input from the task resource assigned to complete the performance of the task of interest.

* * * * *